(12) United States Patent
Johnson

(10) Patent No.: US 11,679,795 B2
(45) Date of Patent: Jun. 20, 2023

(54) PUSH-TO-PULL CONVERTIBLE CARRIAGE

(71) Applicant: Runoceros Fitness Corporation, Vancouver (CA)

(72) Inventor: Jerry Richmond Johnson, New Westminster (CA)

( * ) Notice: Subject to any disclaimer, the term of this patent is extended or adjusted under 35 U.S.C. 154(b) by 848 days.

(21) Appl. No.: 16/520,763

(22) PCT Filed: Feb. 14, 2018

(86) PCT No.: PCT/CA2018/050163
§ 371 (c)(1),
(2) Date: Jul. 24, 2019

(87) PCT Pub. No.: WO2018/148826
PCT Pub. Date: Aug. 23, 2018

(65) Prior Publication Data
US 2020/0283050 A1  Sep. 10, 2020

Related U.S. Application Data

(60) Provisional application No. 62/459,465, filed on Feb. 15, 2017.

(51) Int. Cl.
*B62B 5/06* (2006.01)
*B62B 1/00* (2006.01)
(Continued)

(52) U.S. Cl.
CPC .............. *B62B 5/068* (2013.01); *B62B 1/002* (2013.01); *B62B 7/02* (2013.01); *B62B 7/042* (2013.01);
(Continued)

(58) Field of Classification Search
CPC ........... B62B 5/068; B62B 5/067; B62B 5/06; B62B 1/002; B62B 1/02; B62B 1/04; B62B 1/042; B62B 1/08; B62B 7/02; B62B 7/042; B62B 7/044; B62B 7/12; B62B 7/08; B62B 7/126; B62B 7/04; B62B 7/06; B62B 9/20; B62B 2206/006; B62B 2206/02;
(Continued)

(56) References Cited

U.S. PATENT DOCUMENTS 1,046,663 A * 12/1912 Sleffel ...................... B62B 7/02
280/47.4
1,205,198 A * 11/1916 Hawkinson ...................... 298/5
(Continued)

FOREIGN PATENT DOCUMENTS

DE  29804652 U1  5/1998
DE  20016536 U1  12/2000
(Continued)

*Primary Examiner* — James M Dolak
(74) *Attorney, Agent, or Firm* — Damien G. Loveland

(57) ABSTRACT

A pull-behind carriage has an auxiliary wheel mounted on a reconfigurable drawbar. When the pull-behind carriage is converted to a push carriage, the drawbar is folded so that the auxiliary wheel is positioned on the ground to act as an extra, supporting wheel. Joints in the drawbar are palm operated and can be rotated without continuing to hold the joint. The drawbar may also serve to move the axle of the main wheels backwards when the carriage is converted from the pull-behind mode to the push mode.

19 Claims, 11 Drawing Sheets

(51) Int. Cl.
*B62B 7/02* (2006.01)
*B62B 7/04* (2006.01)
*B62B 7/12* (2006.01)

(52) U.S. Cl.
CPC ............... *B62B 7/044* (2013.01); *B62B 7/12* (2013.01); *B62B 2206/006* (2013.01); *B62B 2301/08* (2013.01)

(58) Field of Classification Search
CPC ............ B62B 2301/08; B62B 2301/10; B62B 2301/34; B62B 2301/00; B62B 2205/104; B62B 2205/14; B62B 2205/00; B62B 2205/10; B62B 2205/12
See application file for complete search history.

(56) References Cited

U.S. PATENT DOCUMENTS

| | | | |
|---|---|---|---|
| 1,234,725 A * | 7/1917 | Brown ........................... 298/5 | |
| 1,429,966 A | 9/1922 | Olsen | |
| 3,887,208 A * | 6/1975 | Vidal .................... B62B 1/12 | D12/101 |
| 5,062,652 A * | 11/1991 | Burke .................... B62C 1/08 | D34/24 |
| 5,076,599 A * | 12/1991 | Lockett ............... B62K 27/003 | 280/643 |
| 5,106,108 A | 4/1992 | Howell | |
| 5,265,891 A * | 11/1993 | Diehl .................... B62B 5/068 | 280/204 |
| 5,454,577 A | 10/1995 | Bell | |
| 5,624,128 A * | 4/1997 | Owens .................... B62K 3/16 | 280/47.38 |
| 5,884,920 A * | 3/1999 | Seto ........................ B62B 9/20 | 280/30 |
| 7,011,316 B1 * | 3/2006 | Peridon .................... B62B 7/02 | 280/30 |
| 7,052,033 B2 * | 5/2006 | McDonell ............ B62D 63/062 | 296/181.7 |
| 7,114,731 B2 * | 10/2006 | Malrick ................... B62B 1/10 | 280/47.25 |
| 7,322,584 B1 | 1/2008 | Parker | |
| 8,100,417 B2 * | 1/2012 | Tsai ........................ B62B 1/12 | 280/47.371 |
| 8,419,035 B2 * | 4/2013 | Wilson .................. B62K 27/12 | 280/204 |
| 8,695,992 B2 * | 4/2014 | Piaget ................. B62K 27/003 | 280/204 |
| 8,814,193 B2 * | 8/2014 | Barnes .................. B62K 27/12 | 280/204 |
| 8,893,937 B1 * | 11/2014 | Bristol .................... B62B 5/068 | 224/153 |
| 9,434,401 B2 * | 9/2016 | Johnson ..................... B62B 7/02 | |
| 9,616,908 B2 * | 4/2017 | Brown .................... B62B 1/208 | |
| 9,637,149 B1 * | 5/2017 | Wang ...................... B62B 1/002 | |
| 9,840,266 B2 | 12/2017 | Caradec et al. | |
| 10,328,963 B2 * | 6/2019 | Johnson .................. B62B 5/082 | |
| 11,350,713 B2 * | 6/2022 | Newman .................. A45C 5/03 | |
| 11,400,965 B2 * | 8/2022 | Panigot .................... B62B 1/12 | |
| 11,414,114 B2 * | 8/2022 | Kramer ................... B62B 5/067 | |
| 11,485,181 B2 * | 11/2022 | Drossel .................. B62K 27/12 | |
| 11,505,225 B2 * | 11/2022 | Ben Shoshan .......... B62B 5/068 | |
| 11,577,132 B2 * | 2/2023 | Payne .................. B62B 5/0461 | |
| 11,577,766 B2 * | 2/2023 | Horowitz ................. B62B 3/02 | |
| 11,584,419 B2 * | 2/2023 | Kelling ..................... B62B 1/12 | |
| 11,590,994 B2 * | 2/2023 | DeBry ...................... B62B 3/02 | |
| 2012/0313345 A1 * | 12/2012 | Kamler .................. B62K 27/12 | 280/292 |
| 2015/0353111 A1 | 12/2015 | Brown | |
| 2016/0332654 A1 * | 11/2016 | Langham ................ B62B 7/048 | |

FOREIGN PATENT DOCUMENTS

| | | |
|---|---|---|
| DE | 202009009678 | 12/2010 |
| DE | 102010005650 A1 | 7/2011 |
| DE | 102014012750 A1 | 3/2016 |
| EP | 1162134 | 12/2001 |
| FR | 2718407 A1 | 10/1995 |
| GB | 2413534 A | 11/2005 |
| WO | 2014154903 | 10/2014 |
| WO | WO2017044984 A1 | 3/2017 |

* cited by examiner

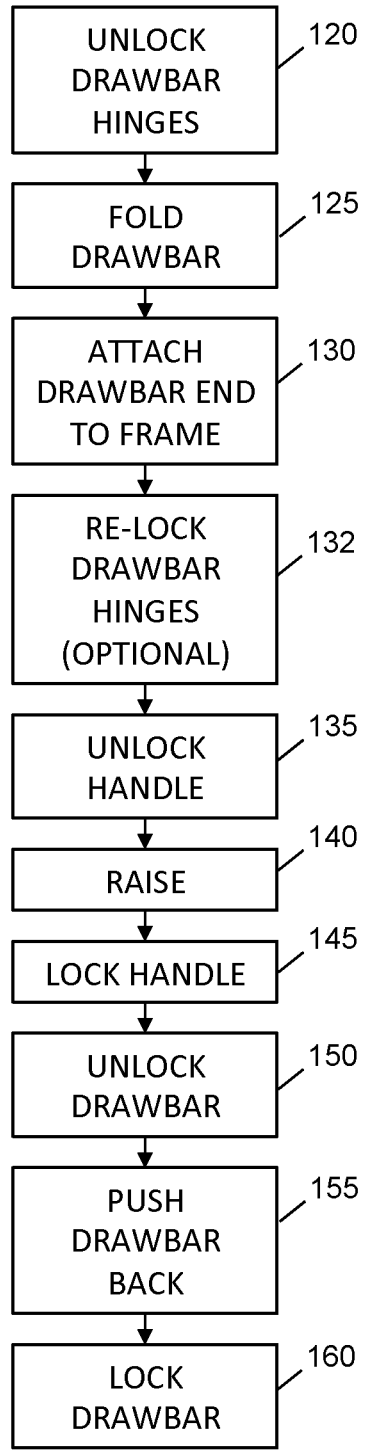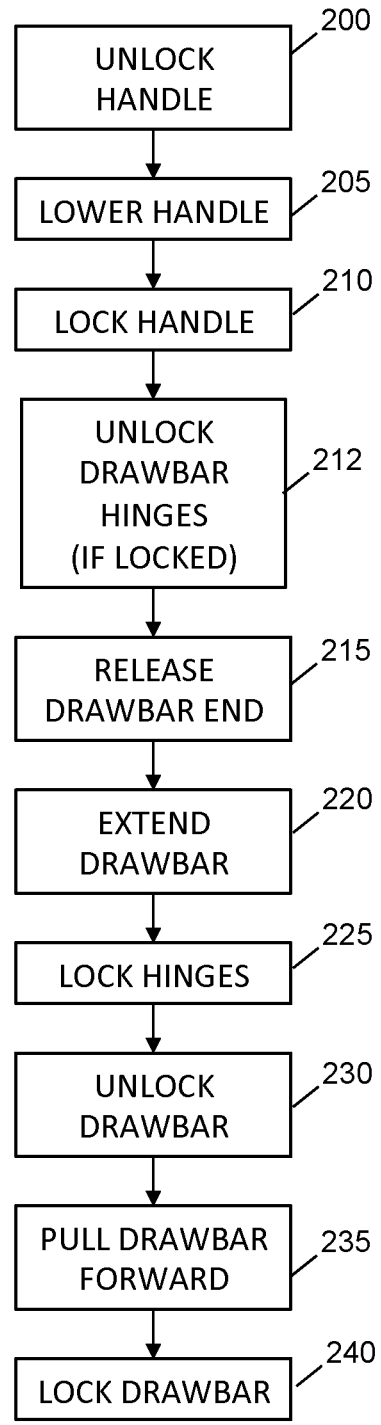
FIG. 10
FIG. 11

PUSH-TO-PULL CONVERTIBLE CARRIAGE

TECHNICAL FIELD

The present disclosure relates generally to a human-propelled carriage, and more particularly to a hands-free pull-behind carriage that is convertible to a carriage that is pushed by hand.

BACKGROUND

Hands-free pulling systems exist that connect pull-behind carriages to a person's waist or torso. Such carriages typically have two wheels, in contrast to the three or four wheels of, for example, a conventional stroller that is pushed by hand.

PCT publication WO2017/044984 to Hanson discloses a convertible stroller having a main carriage and a handle bar assembly, wherein the handle bar assembly is configured to convert between push and pull configurations to enable a user to either push or pull the stroller.

U.S. Pat. No. 6,196,572 to Durrin discloses a convertible trailer and stroller. An upper bar converts from a handle bar position to a roll bar position. The handle bar position provides a push or pull point in the stroller configuration, while the roll bar position operates in the trailer configuration to provide protection to a passenger.

U.S. Pat. No. 9,669,859 to Hansen discloses a stroller that converts to a bicycle trailer. The push handle pivots between a stroller position and a trailer position. Movement of the push handle to the trailer position causes a front wheel to move to a stowed position.

U.S. Pat. No. 9,434,401 to the present inventor discloses a harness and pulling assembly for a pull-behind jogging stroller.

This background information is provided to reveal information believed by the applicant to be of possible relevance to the present invention. No admission is necessarily intended, nor should be construed, that any of the preceding information constitutes prior art against the present invention.

SUMMARY OF INVENTION

A pull-behind carriage has an auxiliary wheel mounted on a reconfigurable drawbar. When the pull-behind carriage is converted to a push carriage, the drawbar is reconfigured so that the auxiliary wheel is positioned on the ground to act as an extra, supporting wheel. The drawbar is adjustable from an extended configuration in the pull-behind mode to a folded configuration in the push mode. The drawbar may also serve to move the axle of the main wheels backward when the carriage is converted from the pull-behind mode to the push mode, and vice versa. Hinge joints in the drawbar are unlockable by pressing a palm button, which does not need to be kept pressed as the drawbar is moved through the majority of its range from one configuration to the other.

An advantage of the present invention is that the convertible carriage can be pulled to a grocery store, for example, when in a first, pull-behind configuration, and then pushed around inside the grocery store when in a second, push configuration.

Disclosed herein is a convertible carriage comprising a body, two rear wheels supporting the body, a foldable drawbar connected to the body, and an auxiliary wheel mounted on the drawbar, wherein, when the drawbar is folded, the auxiliary wheel supports the carriage.

In some embodiments, an end of the drawbar distal from the body is attachable to the body when the drawbar is folded. When the drawbar is extended and the carriage is in the level orientation, the auxiliary wheel is above ground level.

In some embodiments, the two rear wheels are adjustable from a first position behind the centre of gravity of the carriage when the drawbar is folded and the carriage in a level orientation, to a second position forward of the first position relative to the body when the drawbar is extended and the carriage is in the level orientation, wherein the second position is selectable such that when the drawbar is extended and the carriage is loaded and in the level orientation, the center of gravity of the loaded carriage is above an axle joining the rear wheels.

In some embodiments, the drawbar comprises a first hinge joint and a second hinge joint located further from the body than the first hinge joint when the drawbar is extended, wherein the auxiliary wheel is located at the second hinge joint.

In some embodiments, each hinge joint comprises: a palm button; a first arm connected to a first member of the drawbar; a clutch plate rotationally fixed relative to the first arm; a second arm connected to a second member of the drawbar; a translating clutch plate rotationally fixed relative to the second arm, wherein, when the palm button is pressed, the translating clutch plate is translated away from the clutch plate without translating the second arm; a spring that biases the translating clutch plate towards the clutch plate; and range restricting features on the clutch plate and translating clutch plate that prevent the clutch plate and translating clutch plate locking with each other over a first range of angles between a first angle corresponding to the extended drawbar and a second angle corresponding to the folded drawbar.

Also disclosed is a method for converting a carriage from a pull-behind configuration to a push configuration, the carriage having a body, two rear wheels supporting the body, a foldable drawbar connected to the body, and an auxiliary wheel mounted on the drawbar; the method comprising: unlocking one or more hinge joints in the drawbar; folding a distal end of the drawbar downwards so that the auxiliary wheel supports the carriage; unlocking a proximal end of the drawbar from the body; moving the proximal end of the drawbar rearward relative to the body, thereby moving the rear wheels rearward relative to the body.

Further disclosed is a method for converting a carriage from a push configuration to a pull-behind configuration, the carriage having a body, two rear wheels supporting the body, a foldable drawbar connected to the body, and an auxiliary wheel mounted on the drawbar; the method comprising: releasing a distal end of the drawbar from the body; extending the distal end of the drawbar upwards so that the auxiliary wheel is above ground level when the carriage is in a level orientation; locking at least one hinge joint in the drawbar; and moving a proximal end of the drawbar forward relative to the body, thereby moving the rear wheels forward relative to the body.

BRIEF DESCRIPTION OF DRAWINGS

The following drawings illustrate embodiments of the invention, which should not be construed as restricting the scope of the invention in any way.

FIG. 10 is a method for converting a convertible carriage from a pull-behind configuration to a push configuration, according to an embodiment of the present invention.

FIG. 11 is a method for converting a convertible carriage from a push configuration to a pull-behind configuration, according to an embodiment of the present invention.

DESCRIPTION

A. Exemplary Embodiments

Figure 1:
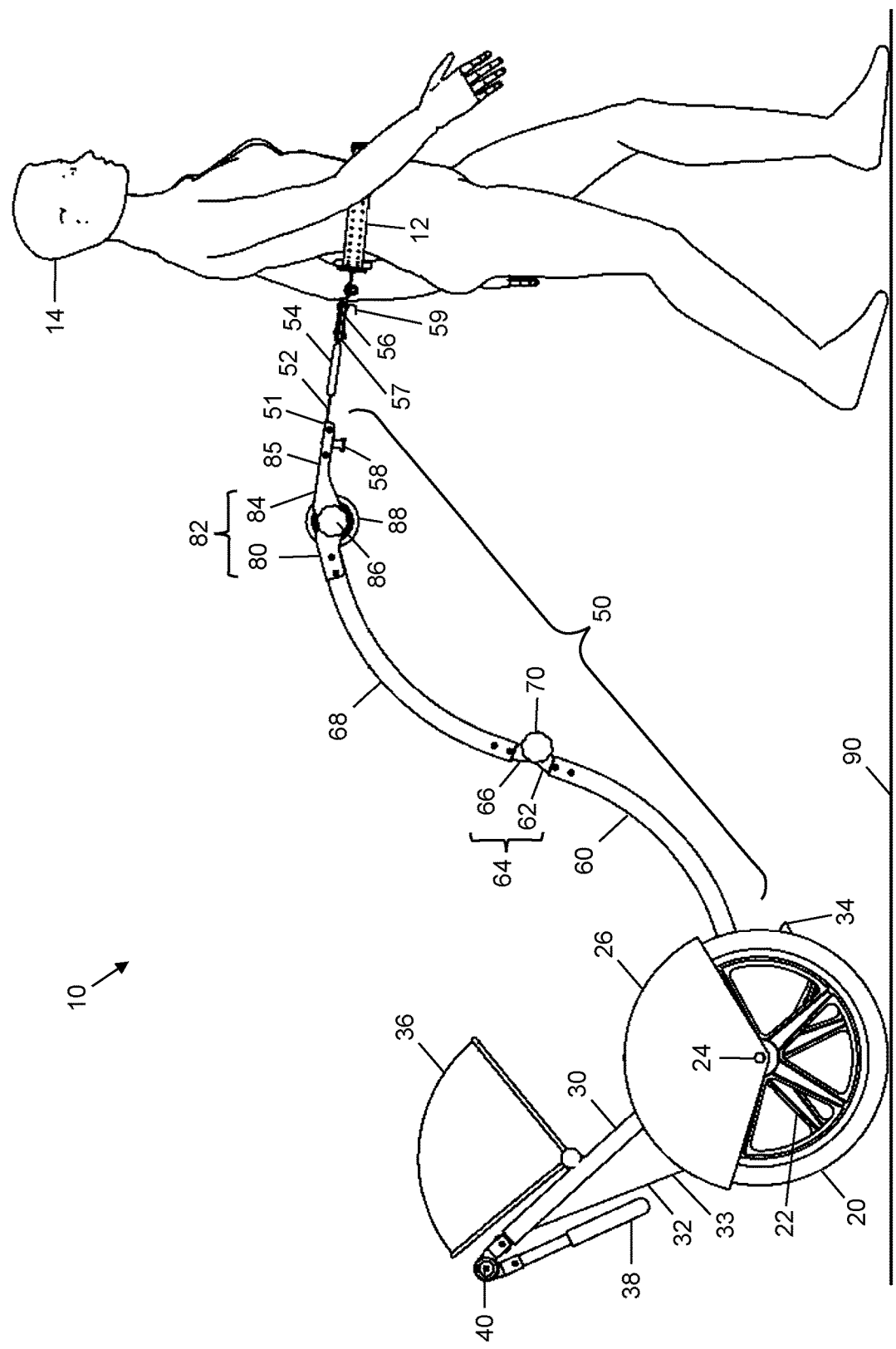
FIG. 1 is a side view of a person pulling a convertible carriage in the pull-behind configuration, according to an embodiment of the present invention.

FIG. 1 illustrates an exemplary embodiment of a convertible carriage 10 in its pull-behind configuration attached to a harness 12 worn by a person 14. The person 14 is pulling or towing the convertible carriage 10 hands-free because the harness 12 is coupled to the person's waist or around the person's hip bones, where it can be tightened without restricting breathing. The person 14 can pull the convertible carriage 10 while doing daily activities such as child care, going to a grocery store, or running for exercise.

The carriage 10 is a wheeled conveyance, cart or trailer to be pushed or pulled by the person 14. The carriage 10 can be a two-wheeled rickshaw-type carriage, which can be a stroller such as a walking, jogging, or running stroller for carrying one or more children or animals or for carrying various goods. One such embodiment might be for cross-country runners who use it to convey camping equipment. The carriage 10 has two main or rear wheels 20, 22 that rotate about a common axle 24. The axle 24 for the wheels 20, 22 is adjustable forward and rearward with respect to the rest of the carriage 10. This is so that a person 14 using the carriage can balance the weight of the carriage and any load held within the carriage over the axle, or sufficiently close to the axle that the average upward or downward force on the harness 12 is within a comfortable range for the person. The weight of the carriage 10 can be balanced over the axle 24, or the carriage can be designed such that with a load in the carriage, the combined weight of the carriage and the load is balanced over the axle. Fenders 26 are present over the upper portions of the main wheels 20, 22.

The carriage 10 has a frame 30 that supports a seat 32 for a baby, toddler or child. The frame 30 and seat 32 can be considered to be the body 33 of the carriage. Just visible in this view is the footrest 34. The carriage 10 has an adjustable and/or removable hood 36. Also present is a handle 38 for use when the carriage is in the push configuration. As the handle 38 is not needed when the carriage 10 is in the pull-behind configuration, it is folded downward from the frame 30 at hinge 40. The hinge 40 includes a locking mechanism to retain the handle 38 in the folded-down position so that it does not flap back and forth when the carriage 10 is being pulled by the person 14.

The carriage 10 includes a drawbar 50, which, at its forward end 51 distal from the body 33, is connected to leaf spring 52. A drawbar is typically a rigid rod above ground level attached to a wheeled carriage, for pulling it either by hand or by a vehicle. The leaf spring is inserted into connector 56 that forms part of the harness 12. Around the leaf spring 52 is a molded grip 54 to help the user insert the leaf spring into the connector 56. The molding 54 is flexible and is made, for example, from a rubber-like material that feels soft to the touch when held. The molding 54 is slid over the leaf spring 52 and then bonded in place.

The leaf spring 52 projects forward out of the grip 54 to form a tongue (not visible), which is inserted into the connector 56. The outermost end of the leaf spring 52 is notched so that it can be retained inside the connector 56. The connection mechanism may be, for example, similar to the mechanism for attaching a seatbelt in a car. A hook 59 is present on the connector 56, which is used to pull out a spring plunger that extends through or into the notch of the leaf spring 52 when the leaf spring is in the connector 56.

The free length of the leaf spring 52, between the forward end 51 of the drawbar 50 and the rearward end 57 of the connector 54, is adjustable. Plunger pin 58 can be retracted to loosen the leaf spring 52 such that it can slide back and forth in the end 51 of the drawbar 50. When the leaf spring 52 has been adjusted to the desired position, the plunger pin 58 is returned to secure the leaf spring in place. The free length of the spring 52 is adjustable to control its stiffness, in order to tune a resonant frequency of the carriage 10 away from a frequency of a gait of the person 14.

The drawbar 50 is rigid when the carriage 10 is set in its pull-behind configuration. It is especially important for the drawbar 50 to be rigid in this configuration for proper functioning of the carriage. The drawbar 50 includes an inner member 60 attached at its lower end to the body of the carriage and at its upper end to arm 62 of hinge 64 or other equivalent joint. The other arm 66 of hinge 64 is connected to the middle member 68 of the drawbar 50. The hinge is lockable by tightening knob 70, which allows the inner member 60 and middle member 68 of the drawbar 50 to be locked at different angles to each other. When the carriage 10 is in the pull-behind configuration, the inner member 60 and middle member 68 are locked in an extended configuration. By locking the two members 60, 68 in position relative to each other, the rigidity of the drawbar 50 is maintained. Instead of knob 70, a cam lever may be used in other embodiments, similar to the quick-release locking mechanism on many bicycle axles. In other embodiments, other locking mechanisms are also possible.

The middle member 68 of the drawbar 50 is attached to arm 80 of hinge 82 or other equivalent joint. The other arm 84 of the hinge 82 forms, or is connected to, the outer member 85 of the drawbar 50. In some embodiments, items 84 and 85 are the same piece, i.e. of unitary construction or monolithic. The hinge 82 is lockable by tightening knob 86, which allows the middle member 68 and outer member 85 of the drawbar 50 to be locked at different angles to each other. When the carriage 10 is in the pull-behind configuration, the middle member 68 and outer member 85 are locked in an extended configuration. By locking the two members 68, 85 in position relative to each other, the rigidity of the drawbar 50 is maintained.

Components of the drawbar 50 are formed from a rigid material such as carbon fiber, wood, plastics, or metals such as tubes of steel, aluminum, titanium or their alloys. Depending on the embodiment, the drawbar 50 can have an overall length between 0.6-1.5 m, for example.

Hinge 82 and outer member 85 form a variable angle bracket, which is used to adjust the angle at which the outer member and leaf spring 52 attach to the harness 12. This is useful to accommodate the fit of the carriage 10 to persons of different height. As well, the angle between the inner member 60 and middle member 68 can be adjusted to accommodate the fit of the carriage 10 to the person 14. As another example, the angle at which the outer member 85 and leaf spring 52 attach to the harness 12 can be selected or optimized such that effects of a vertical component of the periodic or cyclic motions of the person 14 are canceled or offset, or at least partially canceled or offset, by effects of a horizontal component of the periodic or cyclic motions of the person.

A third or auxiliary wheel 88 is mounted on the drawbar 50 and serves as a third road wheel or supporting wheel when the carriage is in the push configuration. The auxiliary wheel 88 is mounted at or near the hinge 82. In the example shown, the auxiliary wheel 88 is mounted coaxially with the center of rotation of the hinge 82. The auxiliary wheel is not used when the carriage 10 is in the pull-behind configuration. It is therefore advantageous for the auxiliary wheel 88 to be lightweight and small if it is desired to keep the overall load pulled by the person 14 as low as possible.

When the carriage 10 is in normal use, either when being pulled or pushed, it is considered to be in a level orientation relative to the ground 90. A level orientation includes tilting of different amounts depending on the settings of the hinges 64, 82 and the height of the person 14, the only requirement being that when the carriage is attached to a person 14 by a harness 12, the auxiliary wheel 88 is above ground level 90.

Figure 2:
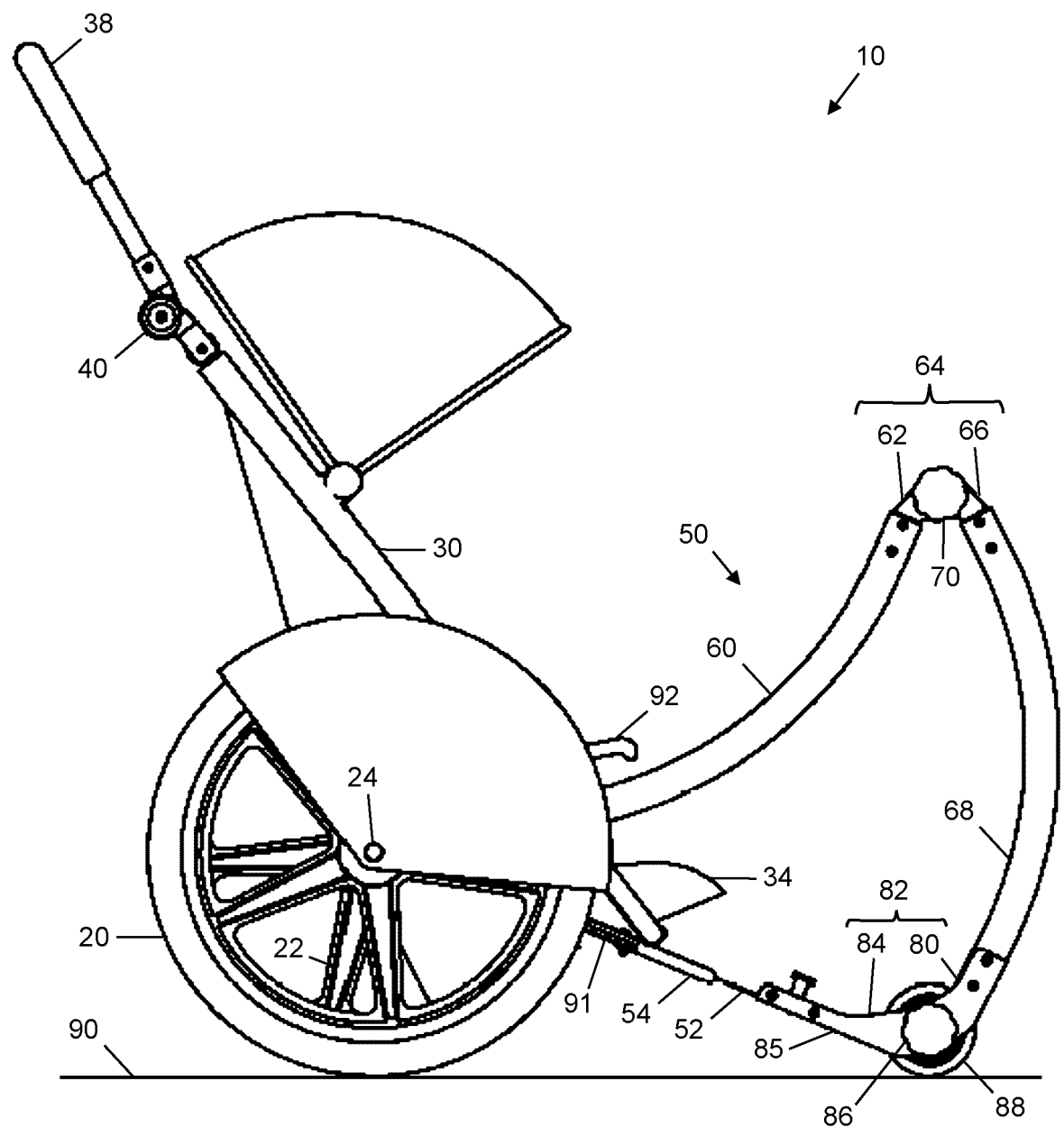
FIG. 2 is a side view of the convertible carriage of FIG. 1 in the push configuration.

Referring to FIG. 2, the carriage is shown in a level orientation in the push configuration, with the auxiliary wheel 88 and both main wheels 20, 22 on the ground 90 and supporting the carriage. The handle 38 has been extended upward about hinge 40 and locked into position. The height of the handle 38 can be adjusted to suit the person pushing the carriage 10 by setting the angle of hinge 40 as desired.

The drawbar 50 is also rigid when the carriage 10 is set in its push configuration. The drawbar 50 has been folded at hinge 64 by loosening knob 70 and moving the middle member 68 downward and inward towards inner member 60. The drawbar 50 has also been folded at hinge 82 by loosening knob 86 and moving the outer member 85 inward towards the body of the carriage 10. The end of the leaf spring 52 has been removed from the harness 12 and attached to a connector 91, which is mounted on the body of the carriage 10. When the leaf spring 52 is attached to the connector 91, tightening of the knobs 70, 86 is optional. However, one reason to tighten them would be to stop potential rattling. When the carriage 10 is in the push configuration, the inner member 60, middle member 68 and outer member 85 are in this folded configuration.

When the carriage 10 is reconfigured from the pull-behind configuration to the push configuration, the main wheels 20, 22 are moved backward relative to the frame 30 of the carriage. As can be seen, the footrest 34 is more visible in this configuration than in FIG. 1 as it has been exposed more by the rearward displacement of the main wheels 20, 22. The main wheels 20, 22 are moved rearward in order to position them sufficiently behind the center of gravity of the carriage 10 so that the carriage is stable and will not topple over when freestanding in the push configuration. To move the main wheels 20, 22 rearward, handle 92 is lifted against the force of a spring, which results in a locating pin (not shown) connected to the handle being lifted out of a corresponding locating hole (not shown) in the top of the inner member 60 of the drawbar 50. The inner member 60, to which the axle 24 is connected, is then free to slide backwards relative to the rest of the carriage 10. When the inner member 60 is in the desired position, the handle 92 is released, causing the locating pin to spring into another locating hole in the inner member 60. This locks the axle 24 of the main wheels 20, 22 in a suitable position relative to the frame 30 for the carriage 10 to be used safely in the push configuration. There may be several different locating holes in the inner member 60, each one matched to a different weight and/or size of the load that is carried by the carriage 10. In other embodiments, alternate locking mechanisms may be used to move the wheels relative to the drawbar and to lock them in place.

Figure 3:
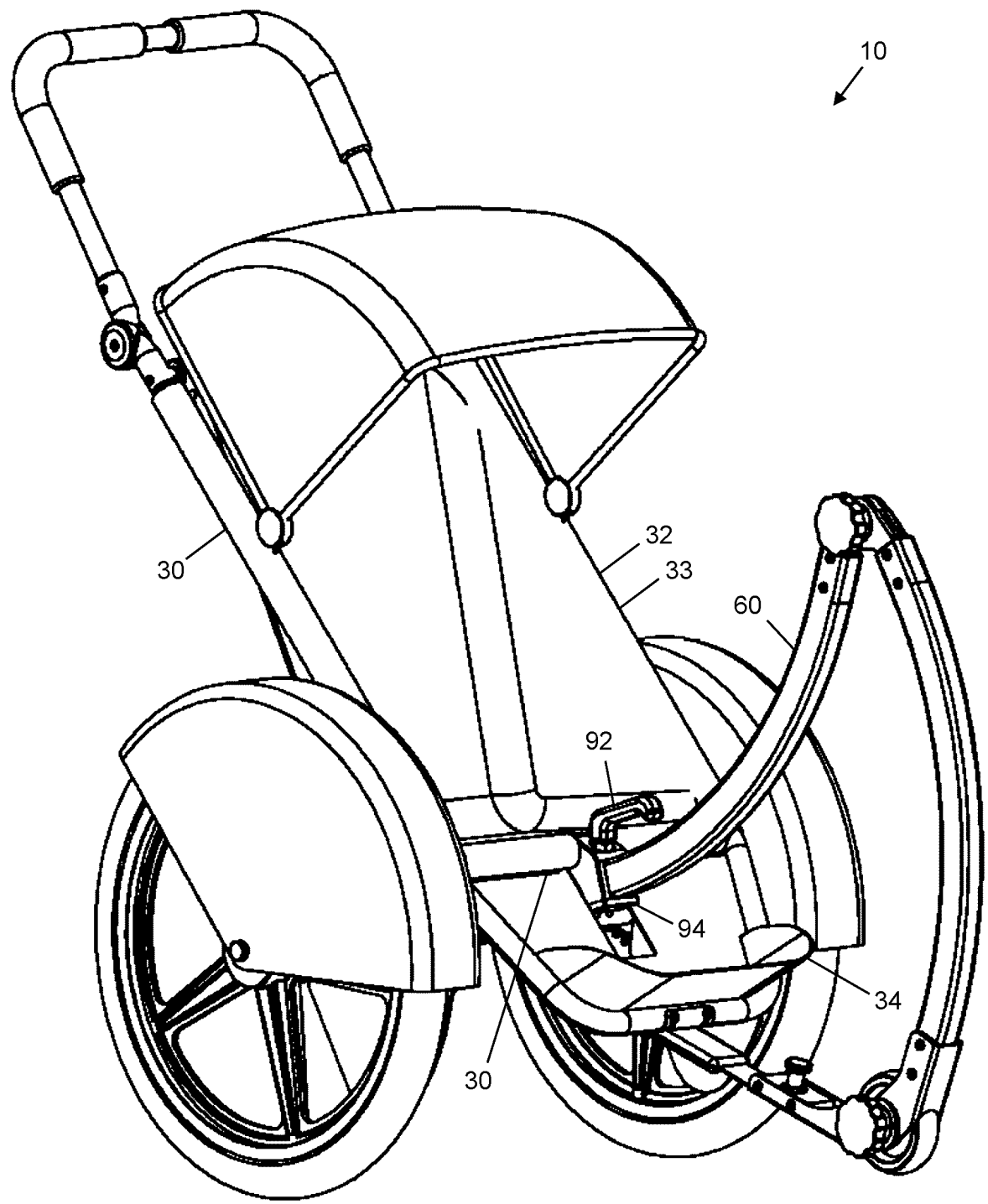
FIG. 3 is a perspective view of the convertible carriage of FIG. 1 in the push configuration.

FIG. 3 shows guide 94 in which is located the end of the inner member 60 of the drawbar 50 that is proximal to the body 33. Guide 94 is mounted to frame 30 of the carriage 10. When handle 92 is lifted, the inner member 60 can slide freely through the guide 94.

Figure 4:
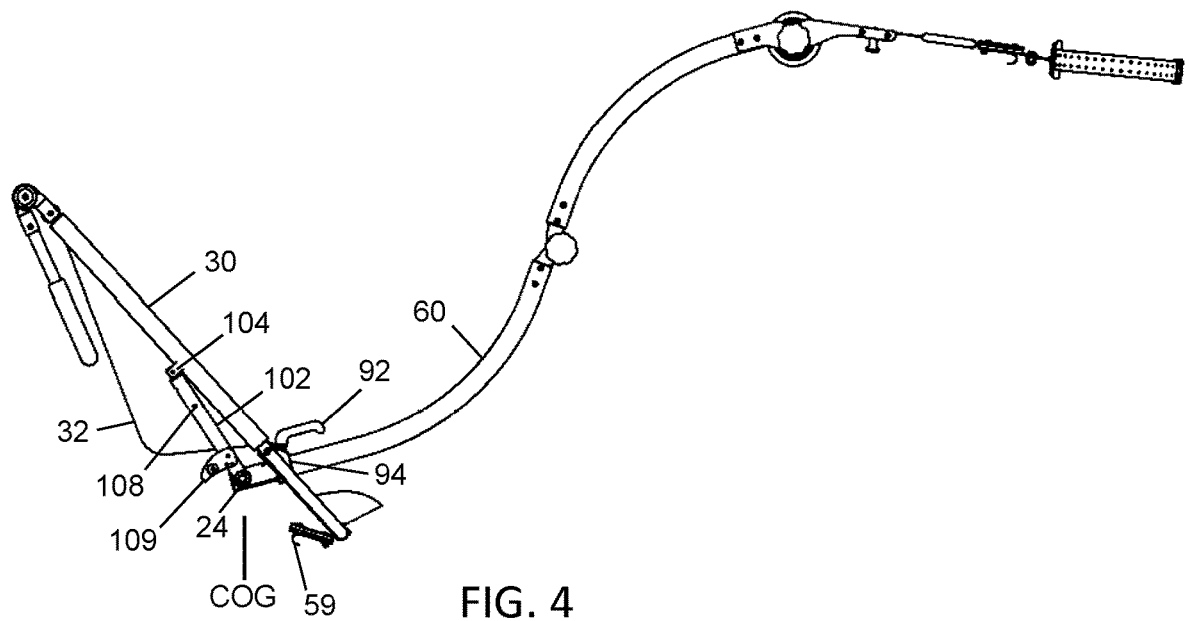
FIG. 4 is a side view of the convertible carriage of FIG. 1 in the pull-behind configuration without the rear wheels.

FIG. 4 shows the carriage 10 in the pull-behind configuration, without the main wheels for clarity. The axle 24, for the main wheels, supports struts 102 to left and right sides of the seat 32, the struts in turn supporting the frame 30 of the carriage 10. The struts 102 are connected pivotally at their ends, i.e. at axle 24 at their lower ends and at pivot points 104 at their upper ends. In the pull-behind configuration, the inner member 60 and axle 24 are positioned in a forward location relative to the frame 30 and seat 32 of the carriage 10, i.e. further forward than when the carriage is in the push mode. As such, the axle 24 is approximately aligned with what would be the center of gravity (COG) of the carriage when loaded. When the carriage loaded with a child is pulled by a person running, it works best if the drawbar weight on the runner is zero, i.e. the vertical force on the runner is neutral. As the axle position moves toward the COG of the combined stroller and child, the drawbar weight approaches neutral, and the stroller provides its best performance.

Projection 108 is a locating feature for locating the fender 26. Projection 109 is a parking brake, and there is one on each wheel.

The drawbar 50 serves the dual purpose of pulling the carriage when it is in its pull-behind configuration, and adjusting the position of the axle for the main wheels.

Figure 5:
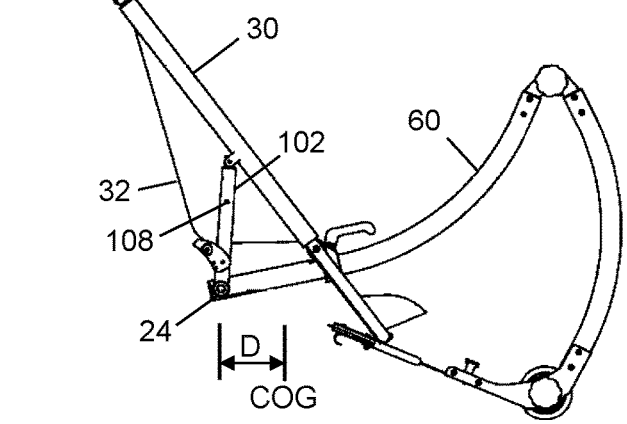
FIG. 5 is a side view of the convertible carriage of FIG. 1 in the push configuration without the rear wheels.

FIG. 5 shows the carriage 10 in the push configuration, without the main wheels for clarity. In the push configuration, the inner member 60 and axle 24 are positioned in a rearward location relative to the frame 30 and seat 32 of the carriage 10, i.e. further backward than when the carriage is in the pull-behind mode. Note that the struts 102 have been swung backward compared to their position in FIG. 4. In the push configuration, the axle 24 is in behind what would be the center of gravity (COG) of the loaded carriage by a distance D.

Figure 6:
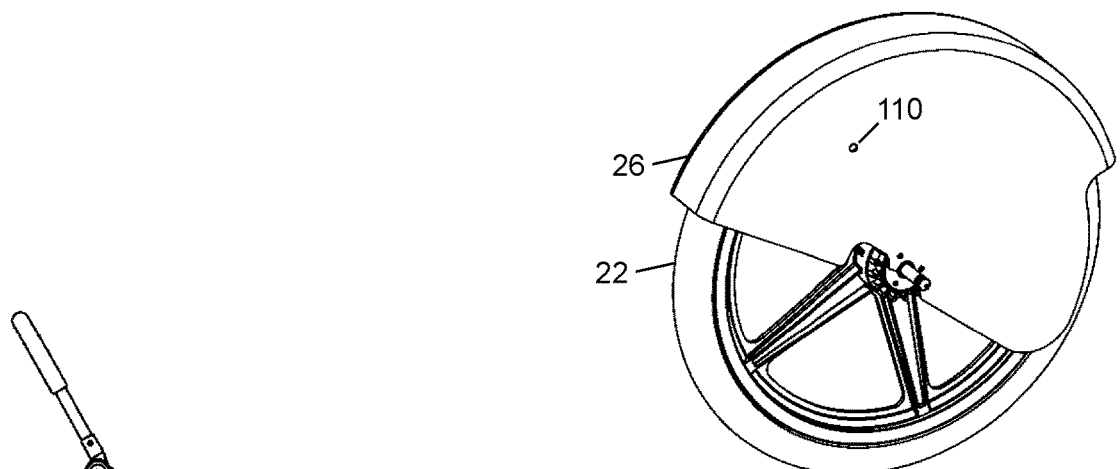
FIG. 6 is a perspective view of a wheel and fender subassembly removed from the carriage.

Referring to FIG. 6, each main wheel 22 with its corresponding fender 26 is removable as a unit. When replacing the wheel-fender subassembly, locating features on the fender such as hole 110 and on the frame of the carriage, such as corresponding projection 108, are present to allow the fender to be positioned correctly at its intended angular location. The connection between the wheel and the frame of the carriage can use any mechanism that is commonly found in existing strollers.

Figure 7:
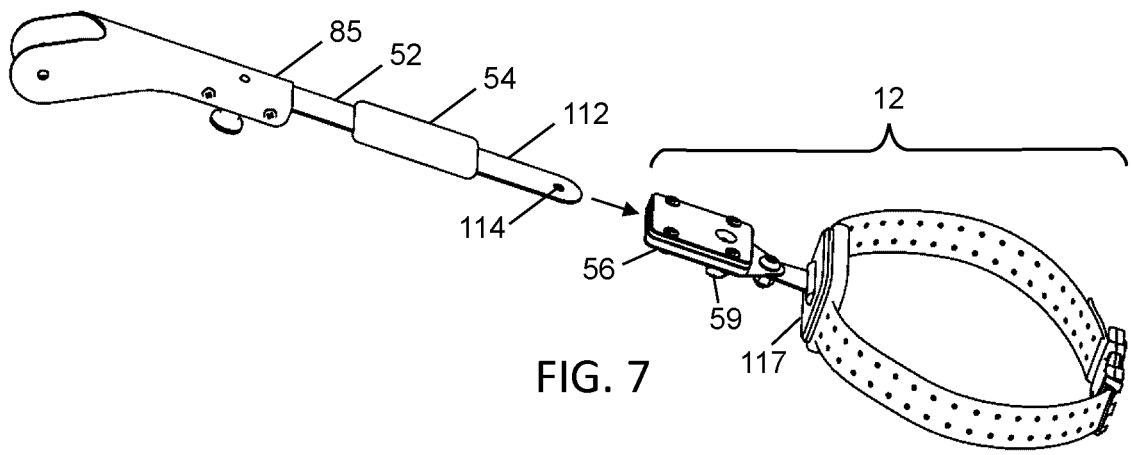
FIG. 7 is a perspective view of the outer end of the drawbar and the harness, disconnected from each other.

FIG. 7 shows the outer member 85 of the drawbar 50 and leaf spring 52 disconnected from the harness 12. Outer end 112 of the leaf spring 52 is visible projecting though the grip 54. The outer end 112 forms a tongue that acts as the male connecting component that mates with connector 56, the female component. In some embodiments, the leaf spring is permanently fixed to the end 85 of the drawbar and terminates at its other end within the grip 54. The exposed length of the leaf spring is then adjusted by varying the insertion depth of the spring into the grip 54. The tongue 112 in this embodiment is then a separate piece of metal.

Figure 8:
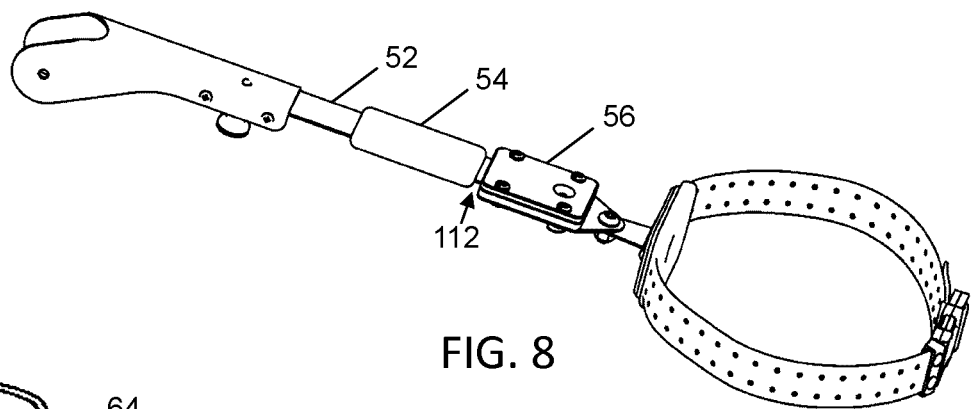
FIG. 8 is a perspective view of the outer end of the drawbar and the harness, connected to each other.

A notch 114 or other connector in the outer end 112 of the leaf spring 52 is used to secure the leaf spring to the connector 56. Hook 59 pulls out a spring plunger that passes into or through the notch 114 in order to secure the end 112 of the leaf spring 52 in the connector 56. The connector 56 can swivel sideways and up and down on a mount 117 of the harness 12. FIG. 8 shows end 112 of the leaf spring 52 inserted into the connector 56.

Figure 9:
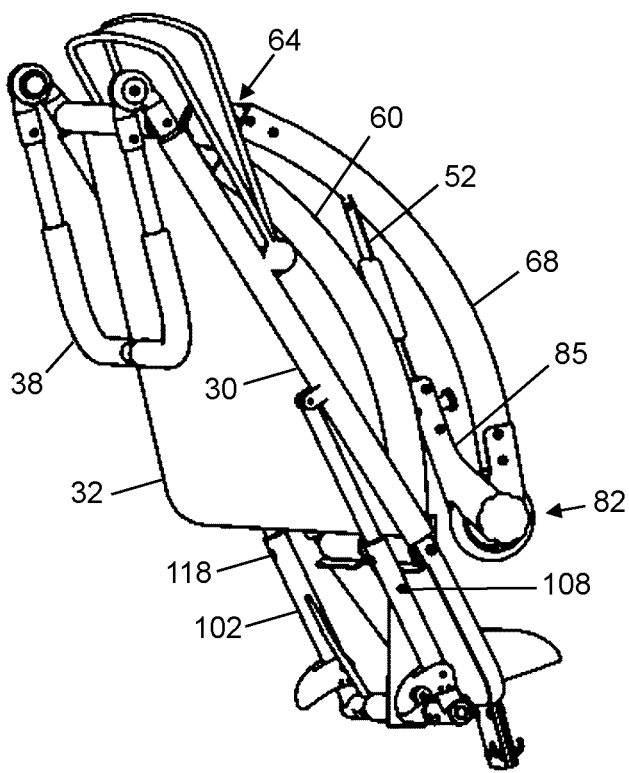
FIG. 9 is a perspective view of the convertible carriage in a fully folded configuration, without the wheel and fender subassemblies.

The carriage 10 is designed to allow for compact storage. Referring to FIG. 9, the carriage in its completely folded configuration is shown, with the wheels and fenders removed. In this configuration the carriage can be stowed in a car trunk, for example. The outer member 85 of the drawbar and leaf spring 52 are completely folded over onto the middle member 68 via hinge 82. The middle member 68 is completely folded over onto the inner member 60 via hinge 64. Inner member 60 is folded onto or into the frame 30 or seat 32. Also, the handle 38 is folded downwards. Locating projection 108 for the fender is visible in this view. Push-pins 118 are also visible that release the telescoping struts 102, allowing them to lengthen as the carriage is transitioned into the completely folded configuration shown. The struts remain in their shortened configuration for both the pull-behind and push configurations of the carriage. In some embodiments, the wheel and fender subassemblies are dimensioned so that they fit in the seat 32 to either side of the folded drawbar, for example for storage or transport of the carriage.

B. Method

FIG. 10 relates to the steps of an exemplary method for converting a convertible carriage from a pull-behind mode to a push mode. In step 120, the hinges 64, 82 in the drawbar 50 are unlocked. In step 125, the drawbar is folded at the hinges 64, 82. In step 130, the end of the drawbar is attached to the frame 30 of the carriage via the leaf spring 52.

In step 132, the drawbar hinges 64, 82 are optionally re-locked. In step 135, the handle 38 is unlocked. In step 140, the handle is raised and then locked in its raised position in step 145.

In step 150, the drawbar is unlocked from the frame of the carriage so that it is free to slide in the guide 94. In step 155, the drawbar is pushed backwards into the guide and then locked in position in step 160.

FIG. 11 relates to the steps of an exemplary method for converting the carriage from a push mode to a pull-behind mode. In step 200, the handle 38 is unlocked, then lowered in step 205 and locked in position in step 210. In step 212, the drawbar hinges 64, 82 are unlocked if they were previously locked.

In step 215, the leaf spring 52 at the end of the drawbar is released from the frame of the carriage. The drawbar is unfolded into its extended configuration in step 220, and the then hinges 64, 82 in the drawbar are locked in step 225.

In step 230, the inner member of the drawbar is unlocked from the guide 94. The drawbar is then pulled forward relative to the guide in step 235. In step 240, the inner member of the drawbar is locked into position.

C. Hinge Joints

Figure 12:
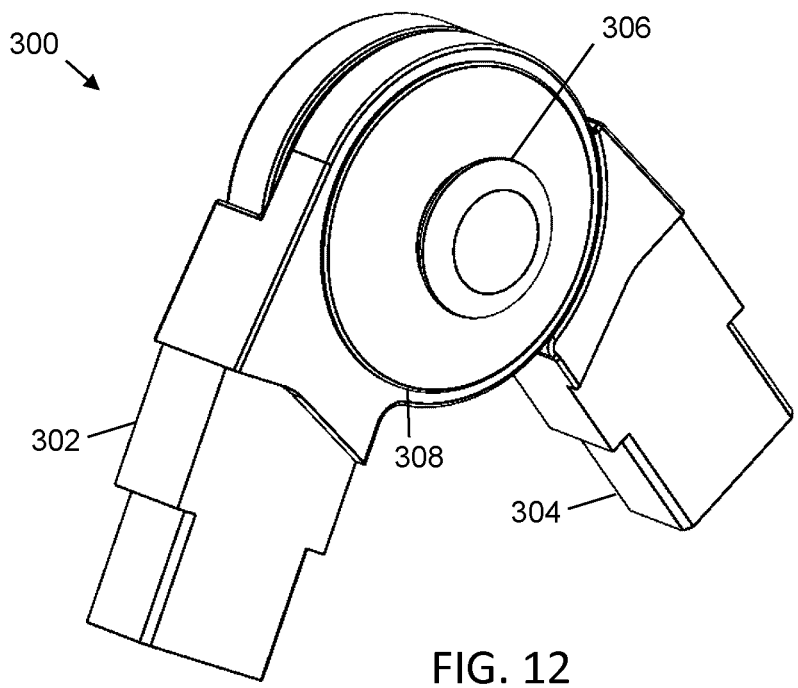
FIG. 12 is a front view of an example of a folded drawbar joint, according to an embodiment of the present invention.
Figure 13:
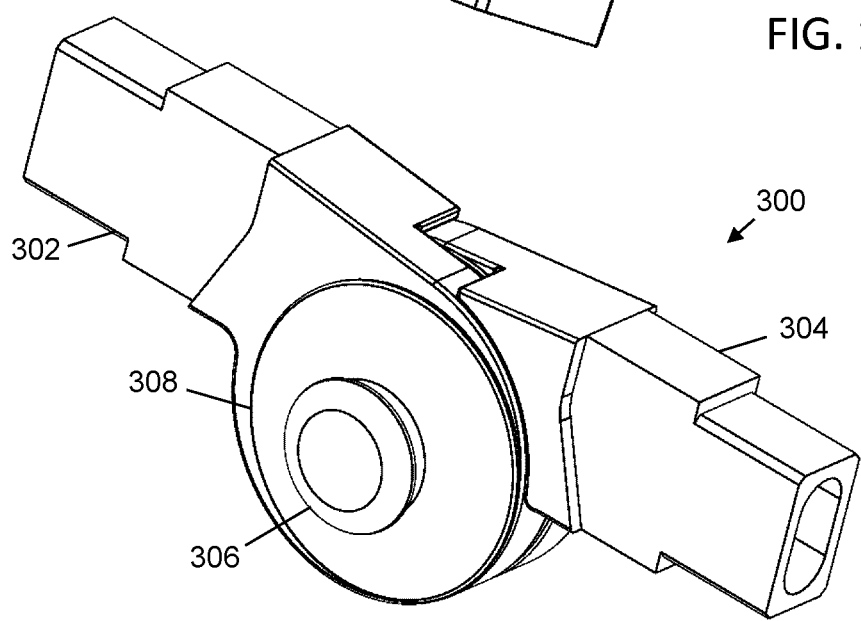
FIG. 13 is a front view of the joint of FIG. 12 shown in an extended position.

FIG. 12 is an alternate, exemplary hinge joint 300 that can be used in the drawbar 50 in place of hinge 64. The hinge joint 300 has arms 302, 304 which connect to lower member 60 and middle member 68 of the drawbar 50. A palm button 306 is pushed inward towards the cap plate 308 to unlock the hinge joint so that the arms 302, 304 can be rotated relative to each other. When the arms 302, 304 have been moved to the new position, the palm button pops back out to lock the arms in the new position. If the palm button is then pressed again, and kept pressed, fine adjustments of the angular position of the hinge joint can be made. FIG. 13 shows the hinge joint 300 with the arms 302, 304 in an extended position. The palm button 306 is sitting proud of the cap plate 308, corresponding to the arms being locked.

Figure 14:
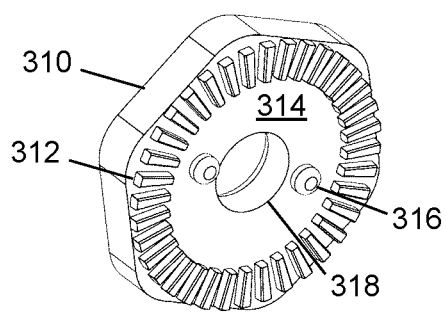
FIG. 14 is the non-translating clutch plate of the joint of FIG. 12.
Figure 15:
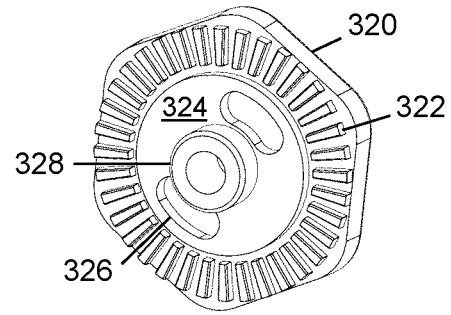
FIG. 15 is the translating clutch plate of the joint of FIG. 12.

Inside the hinge joint 300 there are two clutch plates, which are biased together with a spring, and when they are together they lock the arms at a desired angular position. When the palm button is pressed, the clutch plates come apart. Referring to FIGS. 14 and 15, the non-translating clutch plate 310 (or simply "clutch plate"), which is confined to rotate with the arm 302, and the translating clutch plate 320, which is confined to rotate with arm 304, are shown. The non-translating clutch plate 310 remains in position when the palm button 306 is pressed. The non-translating clutch plate 310 has teeth 312 for engaging with the teeth 322 of the translating clutch plate 320.

Bosses 316 project from the toothed side 314 of the non-translating clutch plate 310, for engaging with arced slots 326 in the toothed side 324 of the translating clutch plate 320. The bosses 316 engage with the slots over two limited angular ranges, one range corresponding to the drawbar 50 being extended and the other corresponding to the drawbar being folded. One of the limited angular ranges allows for some finer adjustment to match the height of the forward end of the drawbar to the size of the person 14 pulling the carriage. The other limited angular range is to allow for some finer adjustment when the drawbar is folded and moved rearward relative to the body of the carriage. When the angle of the joint is between the two ranges, the bosses 316 press against the surface 324 of the translating clutch plate 320, which prevents the teeth 312, 322 from engaging with each other. When the teeth are prevented from engaging, the palm button may be released to free up the user's two hands for adjusting the angle of the drawbar members. A hole 318 through the centre of the non-translating clutch plate permits the inner portion of the palm button 306 to pass through so that it can push against boss 328 of the translating clutch plate 320, to disengage it from the non-translating clutch plate 310.

A third range or single angle may be added in other embodiments, corresponding to the angular position of the joints when the carriage is in the stowage configuration.

Figure 16:
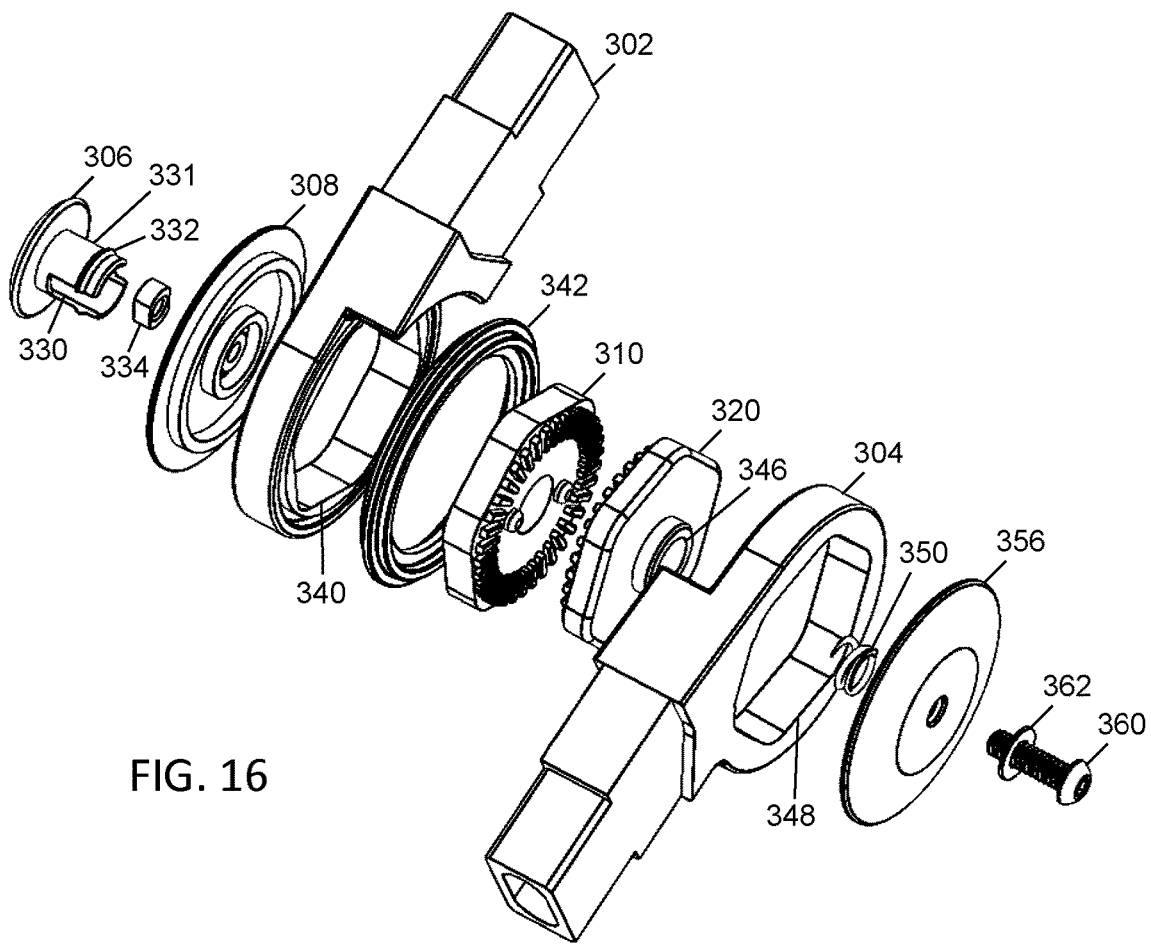
FIG. 16 is an exploded perspective view of the joint of FIG. 12, seen from the rear.
Figure 17:
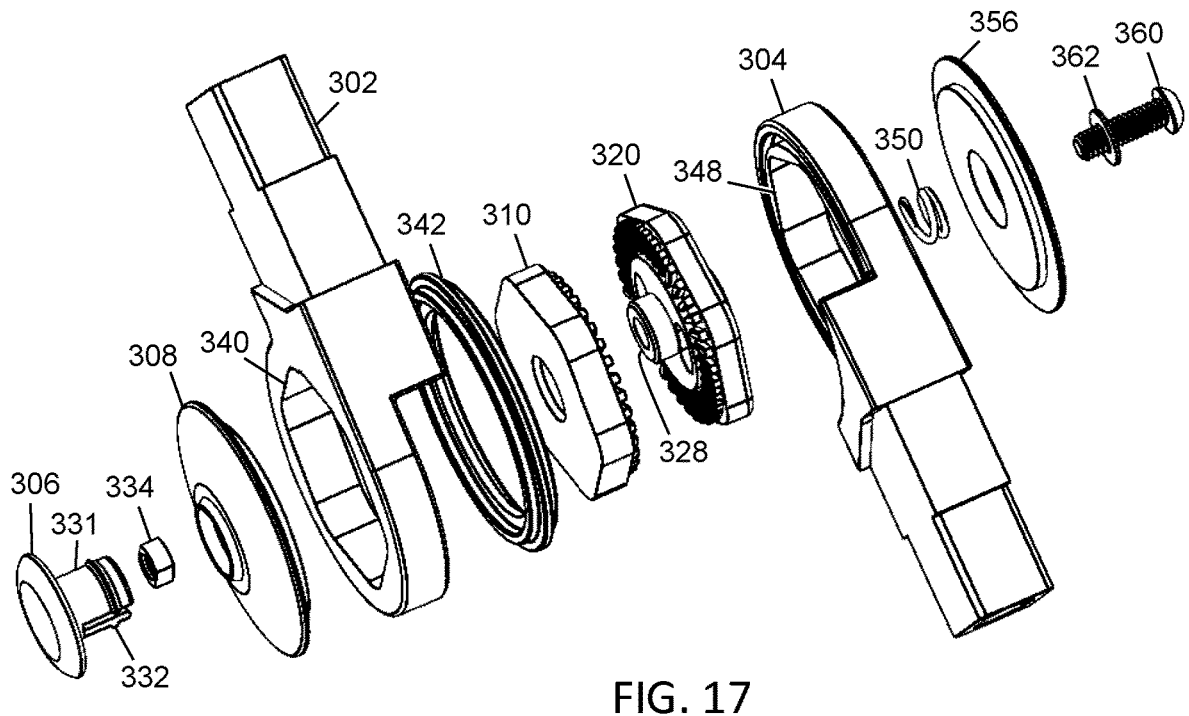
FIG. 17 is an exploded front perspective view of the joint of FIG. 12, seen from the front.

FIGS. 16 and 17 are exploded views of hinge joint 300. Starting from the left, shown is the palm button 306, with slots 330 that allow walls 331 to be squeezed together when the palm button is assembled into the hinge joint. Ridges 332 serve to press against the boss 328 of the translating clutch plate 320. Nut 334 receives bolt 360 to hold the joint together. Next there is the cap plate 308 and arm 302. The arm 302 has a hole 340 shaped to accommodate the non-translating clutch plate 310, to effectively rotationally fix it to the arm, preventing relative angular movement between the arm and the clutch plate. Bearing 342 sits between the two arms 302, 304, and may be lightly lubricated. Translating clutch plate 320 sits in shaped hole 348 in the arm 304 so that they are rotationally fixed relative to each other and relative angular movement between them is prevented, even though the translating clutch plate can move along the axis of the hinge joint within the arm 304. A boss 346 with a circular depression on the translating clutch plate 320 serves to locate coil spring 350, which is positioned around the bolt 360 and presses against the inner surface of a second cap plate 356. A washer 362 is used on the bolt 360.

Figure 18:
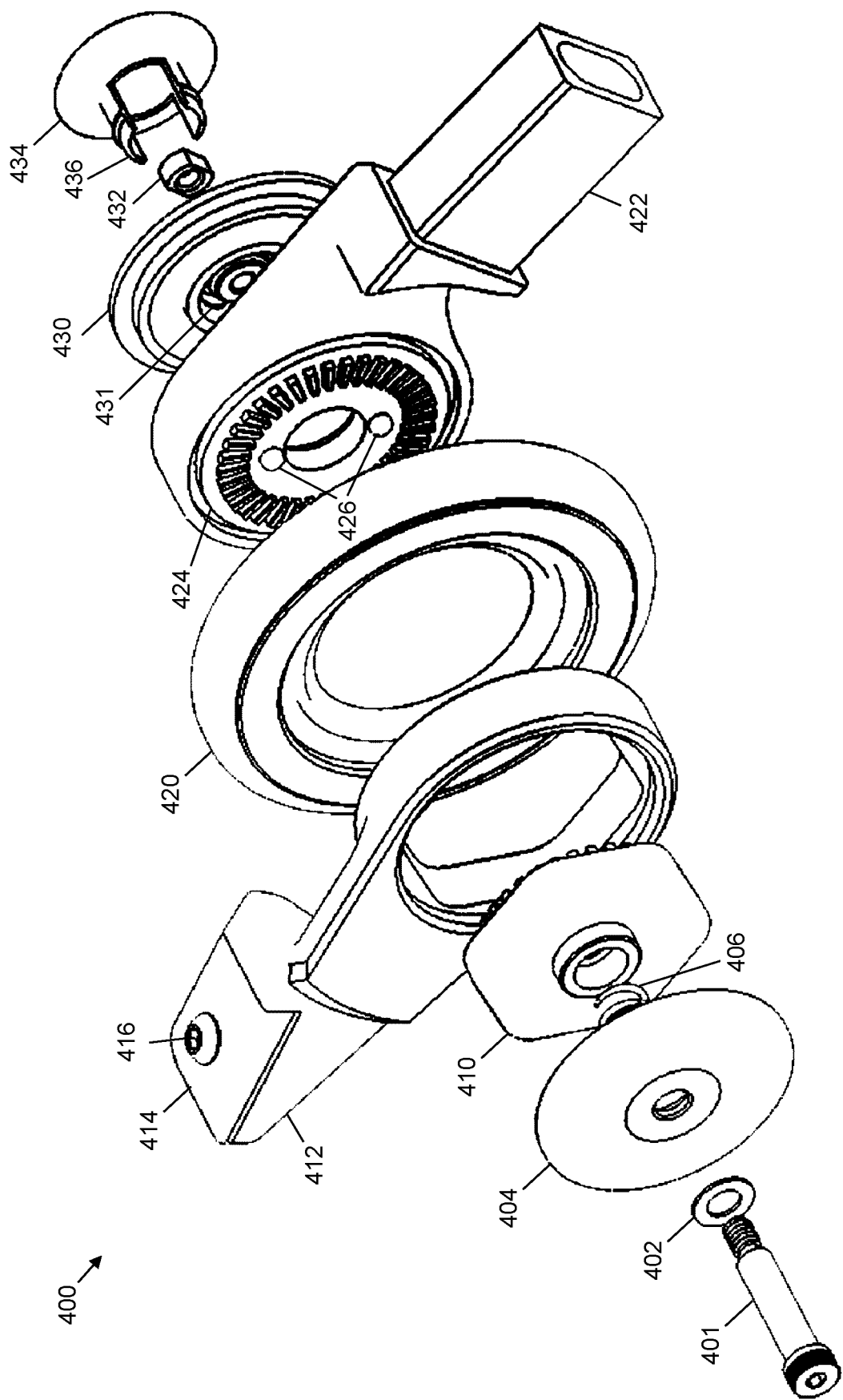
FIG. 18 is an exploded perspective view of an alternate joint seen from the rear, according to an embodiment of the present invention.
Figure 19:
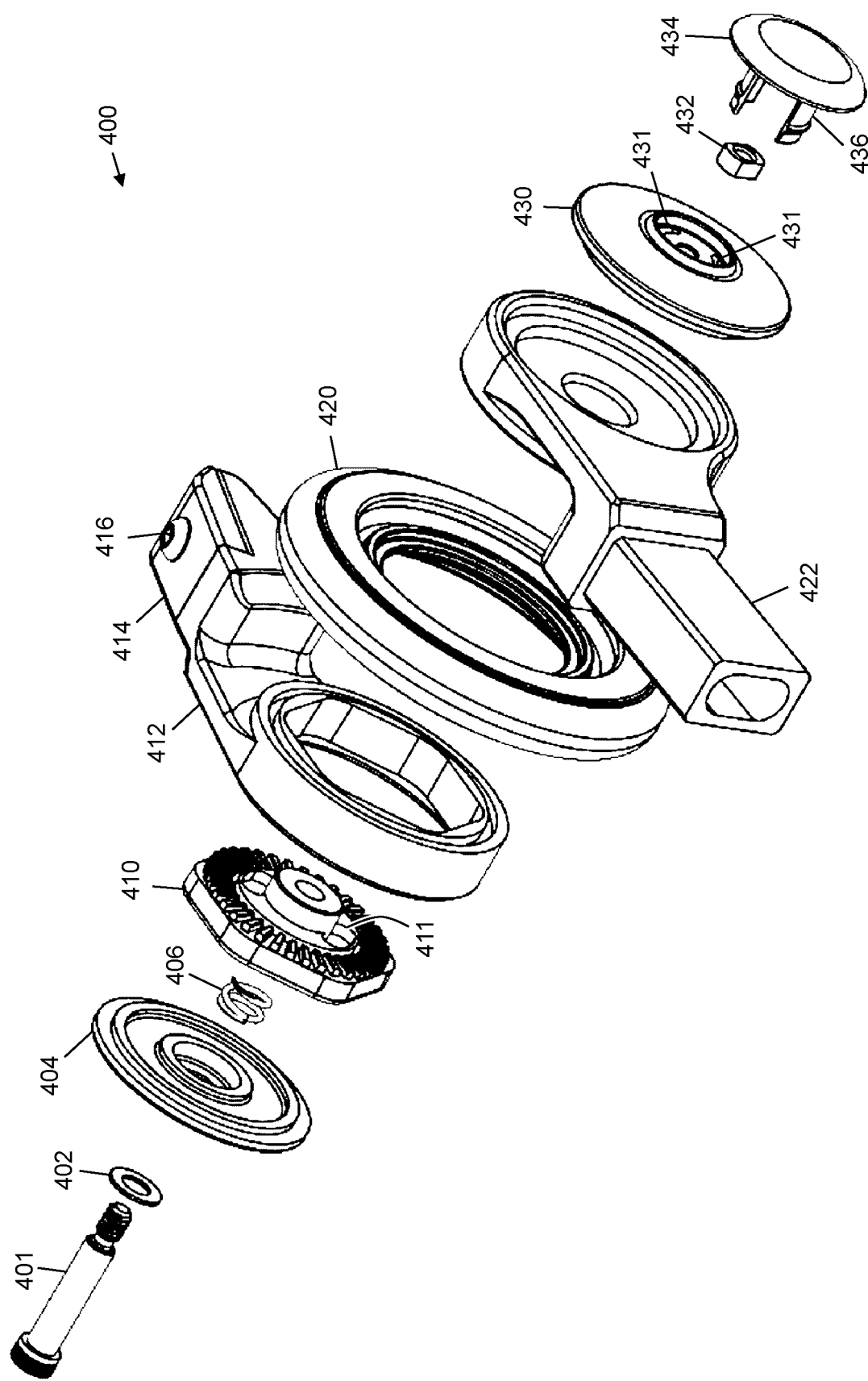
FIG. 19 is an exploded perspective view of the joint of FIG. 18, seen from the front.

FIGS. 18 and 19 are exploded views of an alternate hinge joint 400, which may be used in the position of hinge 82. From the left, the hinge joint 400 includes bolt 401, washer 402, cap plate 404, coil spring 406, translating clutch plate 410 with arced slots 411 (FIG. 19) and arm 412. The arm 412 has a plate 414 that can be tightened onto the leaf spring 52 with bolt 416, to hold the leaf spring to the arm. Next is the auxiliary wheel 420, which rotates about the circular portions of the arms 412, 422 and also serves as a bearing to the arms. The sliding surfaces of the wheel may be lightly lubricated. Arm 422 and non-translating clutch plate 424 are integral in this embodiment. Bosses 426 on the non-translating clutch plate are shown. To the right there is a further end cap 430 with arced slots 431 for the walls 436 of the palm button 434, and then a nut 432 for holding the hinge joint together.

D. Variations

Other embodiments of the invention can have exactly three, exactly four, or more than four main wheels aligned to rotate about a common axle 24 or other common axis of rotation. It is also conceivable that some embodiments have exactly one, wide rear wheel, which is wide enough to prevent sideways toppling of the carriage.

The seat 32 may be made wider to accommodate two children, or two separate seats may be used. In some embodiments, the position of the axle 24 is fixed. In some embodiments, the mechanical connection of the carriage 10 to the harness 12 may employ different components, which are known.

In other embodiments the body 33 of the carriage may include a seat that is integral with a frame, only a frame, only a seat, or another construction such as a box or flatbed for the carriage of goods.

Various known joints can be used to couple the body of the carriage 10 to the drawbar 50, the members 60, 68, 85 of the drawbar to each other, the outer member 85 to the spring 52, and the spring to the harness 12. Hinged joints in the drawbar can be constructed differently in other embodiments.

The carriage 10 can be designed to allow for even more compact storage. For example, one or more of the other components described herein can be telescoping or foldable so that they can be made more compact for storage. The carriage 10 can also be designed to be rapidly converted between the pull-behind and push configurations.

Other techniques may be used to permit the carriage to convert from a pull-behind configuration to a push configuration. For example, instead of using a hinge between the inner and middle members of the drawbar, the drawbar may be rotated from a curving upward configuration for pulling to a curving downward configuration for pushing. The drawbar may include further joints, compared to those illustrated, such that when it is folded for the push configuration, it is more compact. One or more members of the drawbar may be telescoping. The auxiliary wheel may be located at a different position on the drawbar. The main requirement of the invention is that the carriage is convertible from a pull-behind carriage having one or more main wheels as the supporting wheels, to a push carriage that uses the main wheels and at least one auxiliary wheel as the supporting wheels.

Different known techniques may be used to allow the inner member 60 of the drawbar to move back and forth relative to the body of the carriage. In some embodiments the inner member of the drawbar may not move back and forth relative to the rest of the carriage, and instead, the axle for the main wheels is movable back and forth independently of the inner member.

In some implementations, the carriage 10 includes a plurality of drawbars 50 and/or a plurality of springs 52. In some implementations, the carriage 10 and/or the harness 12 can include a safety strap or other braking feature to prevent the carriage from rolling away from the person 14 if the drawbar 50 becomes disconnected from the carriage and/or the person, or if the person loses control of the carriage.

The auxiliary wheel may be made larger than shown, at the expense of introducing more weight to the drawbar. In some embodiments, more than one auxiliary wheel may be present.

The bosses 316 and arced slots 326 are examples of angular range restricting features. In other embodiments, other range restricting features may be used instead.

Figure 20:
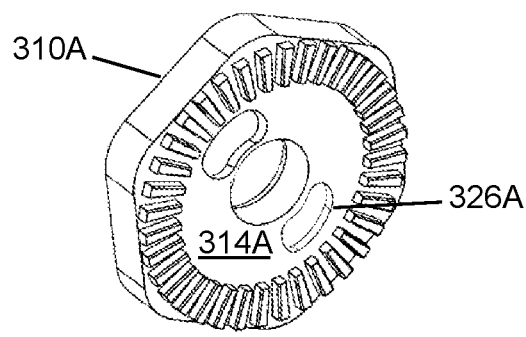
FIG. 20 is an alternate non-translating clutch plate for the joint of FIG. 12.
Figure 21:
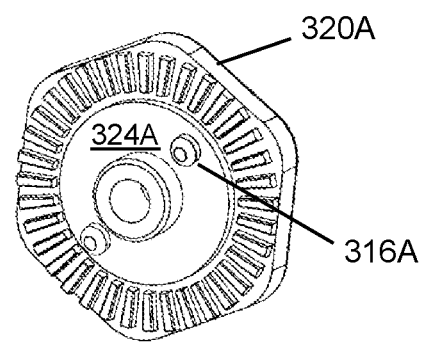
FIG. 21 is an alternate translating clutch plate for the joint of FIG. 12.

Referring to FIGS. 20 and 21, an alternate non-translating clutch plate 310A and an alternate translating clutch plate 320A are shown. Bosses 316A project from the toothed side 324A of the alternate translating clutch plate 320A, for engaging with arced slots 326A in the toothed side 314A of the alternate non-translating clutch plate 310A.

The auxiliary wheel may, in some embodiments, provide castor action.

Any of the components described herein can be fabricated from lightweight, rigid, and strong materials such as carbon fiber, plastics, or metals such as aluminum, steel, or titanium, or combinations of such materials.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Steps in the flowcharts may be performed in a different order to those shown. Accordingly, the specification and drawings are to be regarded in an illustrative, rather than a restrictive, sense. The various embodiments described above can be combined and modified to provide further embodiments. These and other changes can be made to the embodiments in light of the above-detailed description. All parameters, dimensions, materials, and configurations described herein are examples only and depend on the specific embodiment. Accordingly, the scope of the invention is to be construed in accordance with the following claims.

The invention claimed is:

1. A convertible carriage comprising:
  a body;
  two rear wheels supporting the body;
  a drawbar connected to the body, the drawbar being foldable;
  a connector attached to an end of the drawbar distal from the body; and
  an auxiliary wheel mounted on the drawbar;
  wherein the drawbar folds between the body and the auxiliary wheel and, when the drawbar is folded by moving the end of the drawbar distal from the body downwards and towards the body, and attaching the connector to the body, the auxiliary wheel supports the convertible carriage.

2. The convertible carriage of claim 1, wherein:
  when the drawbar is folded, the auxiliary wheel supports the convertible carriage in a level orientation; and
  when the drawbar is extended and the convertible carriage is in the level orientation, the auxiliary wheel is above ground level.

3. The convertible carriage of claim 2 wherein the drawbar is further foldable into a stowage configuration.

4. The convertible carriage of claim 1, further comprising a handle attached to the body for pushing the convertible carriage, wherein the handle is lockable in a folded configuration when pulling the convertible carriage.

5. The convertible carriage of claim 1, wherein the body comprises a frame and a seat.

6. The convertible carriage of claim 1, further comprising:
  a fender on each of the two rear wheels, each fender defining a hole in a side thereof; and
  projections on the body corresponding to said holes, to angularly position the fenders on the body;
  wherein each rear wheel with its corresponding fender is detachable from the body as a subassembly.

7. The convertible carriage of claim 1, wherein the two rear wheels are adjustable from:
  a first position behind the center of gravity of the convertible carriage when the drawbar is folded and the convertible carriage in a level orientation; to
  a second position forward of the first position relative to the body when the drawbar is extended and the convertible carriage is in the level orientation;
  wherein the second position is selectable such that when the drawbar is extended and the convertible carriage is loaded and in the level orientation, the center of gravity of the loaded convertible carriage is above an axle joining the rear wheels.

8. The convertible carriage of claim 1, wherein the drawbar comprises:
  a first hinge joint; and
  a second hinge joint located further from the body than the first hinge joint when the drawbar is extended;
  wherein the auxiliary wheel is located at the second hinge joint.

9. The convertible carriage of claim 8, wherein each hinge joint comprises:
  a palm button;
  a first arm connected to a first member of the drawbar;
  a clutch plate rotationally fixed relative to the first arm;
  a second arm connected to a second member of the drawbar;
  a translating clutch plate rotationally fixed relative to the second arm, wherein, when the palm button is pressed, the translating clutch plate is translated away from the clutch plate without translating the second arm;
  a spring that biases the translating clutch plate towards the clutch plate; and
  range restricting features on the clutch plate and the translating clutch plate that prevent the clutch plate and the translating clutch plate locking with each other over a first range of angles between a first angle corresponding to an extended drawbar configuration and a second angle corresponding to a folded drawbar configuration;
  wherein the range restricting features comprise:
  a boss on one of the clutch plate and the translating clutch plate; and
  two arced slots on the other of the clutch plate and the translating clutch plate;
  wherein, when the boss is aligned with any one of the arced slots, the clutch plate and the translating clutch plate can lock, and when the boss is not aligned with either of the arced slots the clutch plate and the translating clutch plate cannot lock.

10. The convertible carriage of claim 9, wherein the palm button does not need to be pressed as its respective hinge joint is moved through the first range of angles.

11. The convertible carriage of claim 9, wherein the range restricting features permit the clutch plate and the translating clutch plate to lock with each other over a second range of angles corresponding to a range of settings of the extended drawbar configuration and a third range of angles corresponding to a range of settings of the folded drawbar configuration.

12. A method for converting a carriage from a pull-behind configuration to a push configuration, the carriage having a body, two rear wheels supporting the body, a drawbar that is foldable and connected to the body, and an auxiliary wheel mounted on the drawbar; the method comprising:
  unlocking one or more hinge joints in the drawbar;
  folding a distal end of the drawbar downwards so that the auxiliary wheel supports the carriage;
  attaching the distal end of the drawbar to the body with a connector at the distal end of the drawbar;
  unlocking a proximal end of the drawbar from the body; and
  moving the proximal end of the drawbar rearward relative to the body, thereby moving the rear wheels rearward relative to the body.

13. A method for converting a carriage from a push configuration to a pull-behind configuration, the carriage having a body, two rear wheels supporting the body, a drawbar that is foldable and connected to the body, and an auxiliary wheel mounted on the drawbar; the method comprising:

releasing a distal end of the drawbar from the body by disconnecting a connector at the distal end of the drawbar from the body;

extending the distal end of the drawbar upwards so that the auxiliary wheel is above ground level when the carriage is in a level orientation;

locking at least one hinge joint in the drawbar; and moving a proximal end of the drawbar forward relative to the body, thereby moving the rear wheels forward relative to the body.

14. The convertible carriage of claim 1, wherein the body comprises a frame.

15. The convertible carriage of claim 1, wherein the body comprises a seat.

16. The convertible carriage of claim 1, further comprising a fender on each of the two rear wheels, wherein each rear wheel with its corresponding fender is detachable from the body as a subassembly.

17. The convertible carriage of claim 1, wherein the drawbar is rigid when the convertible carriage is set in a pull-behind configuration.

18. The convertible carriage of claim 1, wherein the drawbar is rigid when folded and the convertible carriage is set in a push configuration.

19. The convertible carriage of claim 1, wherein when the drawbar is folded the auxiliary wheel and the two rear wheels support the convertible carriage stably when the convertible carriage is pushed.

* * * * *